US012767485B2

(12) United States Patent
Kent-Rodgman et al.

(10) Patent No.: US 12,767,485 B2
(45) Date of Patent: Oct. 20, 2026

(54) MINE HOIST MONITORING SYSTEM

(71) Applicant: ABB Schweiz AG, Baden (CH)

(72) Inventors: Christopher Kent-Rodgman, Saskatoon SK (CA); Stephen Keen, Bredell (ZA); Sean Martin, Midrand (ZA); Mike Davis, Centurion (ZA)

(73) Assignee: ABB SCHWEIZ AG, Baden (CH)

(*) Notice: Subject to any disclaimer, the term of this patent is extended or adjusted under 35 U.S.C. 154(b) by 533 days.

(21) Appl. No.: 18/556,079

(22) PCT Filed: Apr. 19, 2021

(86) PCT No.: PCT/EP2021/060088

§ 371 (c)(1),
(2) Date: Oct. 18, 2023

(87) PCT Pub. No.: WO2022/223095

PCT Pub. Date: Oct. 27, 2022

(65) Prior Publication Data

US 2024/0182264 A1 Jun. 6, 2024

(51) Int. Cl.
*B66B 5/00* (2006.01)
*B66B 1/34* (2006.01)
(Continued)

(52) U.S. Cl.
CPC ............ *B66B 5/0031* (2013.01); *B66B 15/06* (2013.01); *B66B 19/06* (2013.01); *B66B 1/3461* (2013.01); *B66B 15/04* (2013.01)

(58) Field of Classification Search
CPC ....... B66B 19/00; B66B 15/06; B66B 5/0006; B66B 1/3461; B66B 15/04; B66B 5/0031
(Continued)

(56) References Cited

U.S. PATENT DOCUMENTS

2011/0024378 A1* 2/2011 Pleuss .................... B66C 13/18
212/270

FOREIGN PATENT DOCUMENTS

AU 2016412018 A1 6/2018
CN 105675280 A 6/2016
(Continued)

OTHER PUBLICATIONS

Wang et al. (AU 2016412018 A1)Monitoring Apparatus And Method For Dynamic Contact State of Multi-layer Wound Wire Rope And Drum in Ultra-deep Well (Year: 2018).*
(Continued)

*Primary Examiner* — Jorge L Carrasquillo
(74) *Attorney, Agent, or Firm* — Greenberg Traurig, LLP

(57) ABSTRACT

A mine hoist monitoring system (102) for monitoring a mine hoist (100) comprising a hoist drum (120), the mine hoist monitoring system (102) comprising a hoist controller (150) configured for controlling the mine hoist (100); a plurality of strain gauges (144) mounted on the hoist drum (120); and at least one drum data node (140) mounted on the hoist drum (120), the plurality of strain gauges (144) being coupled to the at least one drum data node (140), wherein the at least one drum data node (140) is configured for determining strain signals indicative of strain in the hoist drum (120) using the plurality of strain gauges (144); wherein the at least one drum data node (140) is configured for transmitting the strain signals to the hoist controller (150); wherein the hoist controller (150) is configured for determining a strain distribution in the hoist drum (120) based on the strain signals received from the at least one drum data node (140), and wherein the hoist controller (150) is configured for visualizing the strain distribution.

19 Claims, 4 Drawing Sheets

(51) Int. Cl.
*B66B 15/04* (2006.01)
*B66B 15/06* (2006.01)
*B66B 19/06* (2006.01)

(58) Field of Classification Search
USPC .......................................................... 187/391
See application file for complete search history.

(56) References Cited

FOREIGN PATENT DOCUMENTS

| | | | |
|---|---|---|---|
| CN | 107161824 | A | 9/2017 |
| CN | 107228761 | A | 10/2017 |
| CN | 206751162 | U | 12/2017 |
| CN | 107651521 | A | 2/2018 |
| CN | 108083046 | A | 5/2018 |
| CN | 107161824 | B | 4/2019 |

OTHER PUBLICATIONS

Wang et al. (CN 105675280 A) Kilometer Deep Well Hoisting Machine Main Shaft Bending And Torsion Complex Fatigue Damage Monitoring Device And Method (Year: 2016).*

Fang et al. (CN 206751162 U) Wire Rope of Hoisting Machine Static Tension Online Intelligent Monitoring System (Year: 2017).*

Peng et al. (CN 108083046 A) A Mine Vertical Well Lifting System Cable Load Monitoring Method (Year: 2018).*

Tao, Sun, et al.; "Experimental Study on Stress Monitoring of Winding Hoist Drum Shell"; Coal Mine Machinery, vol. 40, No. 03; China Academic Journal Electronic Publishing House; Mar. 15, 2019; 2 Pages.

Chinese Second Office Action; Application No. 2021800971988; Completed: Jan. 3, 2025; Issued: Jan. 4, 2025; 2 Pages.

Wang, Ying, et al.; "Sheave wheel stress wireless monitoring system research of mine hoist" ; 2010 2nd International Conference on Advanced Computer Control (ICACC); IEEE; Shenyang, China; Mar. 27, 2010; 5 Pages.

Ma, Chi, et al.; "Vibration modal shapes and strain measurement of the main shaft assembly of a friction hoist", Journal of Vibroengineering, vol. 19, No. 8; Dec. 31, 2017; 10 Pages.

International Preliminary Report on Patentability; Application No. PCT/EP2021/060088; Issued: Mar. 21, 2023; 7 Pages.

International Search Report and Written Opinion of the International Searching Authority; Application No. PCT/EP2021/060088; Completed: Dec. 9, 2021; Mailing Date: Dec. 12, 2023; 15 Pages.

Wang, Fei, et al.; "Failure Analysis of Large Drum and its Structure Improvement in Hoist"; Journal of Anhui University of Technology; Natural Science Edition, vol. 33, No. 1; Jan. 2016; 7 Pages.

Chinese Office Action; Application No. 2021800971988; Completed: May 29, 2024; Issued: May 31, 2024; 2 Pages.

* cited by examiner

MINE HOIST MONITORING SYSTEM

TECHNICAL FIELD

Embodiments of the present disclosure relate to a mine hoist monitoring system for monitoring a mine hoist. Further embodiments of the present disclosure relate to a method of monitoring a mine hoist.

BACKGROUND

Mine hoists are broadly used in underground mining. Mechanical components of mine hoists are typically designed using techniques such as classical strength calculations or traditional engineering methods. Often, stress and strain within the mine hoist mechanical components are calculated for normal operation of the mine hoist and for rare, abnormal events such as rope breaks and overloading. The mine hoist mechanical components can be designed so that acceptable strain levels in the mechanical components are not exceeded throughout normal loading conditions or during predicted abnormal loading conditions. Safety factors may provide additional assurance that designed strain values are not exceeded in normal or abnormal operation conditions.

However, conventional processes of mechanical design are of a predictive nature and based on an assumption of a pre-determined, limited number of mine hoist load cycles. After the initial design and commissioning of the mine hoist, mechanical strain occurring within the mine hoist components are typically no longer considered. Conventionally, it is assumed that the designed safety factors are sufficient to provide safe operation of the mine hoist.

SUMMARY

In view of the foregoing, the present disclosure is directed to a mine hoist monitoring system and a method of monitoring a mine hoist that can particularly provide insight into an actual condition of the mine hoist for monitoring and/or controlling the mine hoist in real time and/or over the life of the mine hoist.

According to an aspect of the present disclosure, a mine hoist monitoring system for monitoring a mine hoist is provided. The mine hoist includes a hoist drum. The mine hoist monitoring system includes a hoist controller configured for controlling the mine hoist, a plurality of strain gauges mounted on the hoist drum, and at least one drum data node mounted on the hoist drum. The plurality of strain gauges are coupled to the at least one drum data node, wherein the at least one drum data node is configured for determining strain signals indicative of strain in the hoist drum using the plurality of strain gauges. The at least one drum data node is configured for transmitting the strain signals to the hoist controller. The hoist controller is configured for determining a strain distribution in the hoist drum based on the strain signals received from the at least one drum data node, and the hoist controller is configured for visualizing the strain distribution.

According to another aspect of the present disclosure, a method of monitoring a mine hoist including a hoist drum is provided. The method includes determining, by at least one drum data node mounted on the hoist drum, strain signals indicative of strain in the hoist drum. The at least one drum data node determines the strain signals using a plurality of strain gauges coupled to the at least one drum data node, the plurality of strain gauges being mounted on the hoist drum.

The method further includes transmitting, by the at least one drum data node, the strain signals to a hoist controller, the hoist controller being configured for controlling the mine hoist. The method further includes determining, by the hoist controller, a strain distribution in the hoist drum based on the strain signals. The method further includes visualizing, particularly by the hoist controller, the strain distribution. It should be understood that the method may include any further features and/or steps according to embodiments described herein.

Embodiments of the present disclosure may provide a model of the mine hoist, particularly a digital twin model, for monitoring and/or controlling the mine hoist based on a measurement of strain in the hoist drum using a plurality of strain gauges. For example, the mine hoist monitoring system or methods disclosed herein can provide real-time monitoring of strain in the hoist drum of the mine hoist and/or tracking of a remaining or consumed fatigue life of the mine hoist over time. Monitoring of the mine hoist according to embodiments may be used to increase an efficiency of a mine hoist operation cycle, increase safety by creating alarms or by monitoring consumed fatigue life or remaining fatigue life of the mine hoist, or embodiments can reduce the cost of downtime of the mine hoist by recommending maintenance interventions prior to failure of a mine hoist component.

According to embodiments of the present disclosure, a mine hoist includes a hoist drum. The hoist drum may be rotated by a mine hoist drive of the mine hoist. The hoist drum may particularly include a drive shaft, the drive shaft being rotatable by the mine hoist drive. The drive shaft can be supported by bearings of the mine hoist. The hoist drum can include a drum cylinder having a rope support surface for supporting one or more ropes of the mine hoist. The drum cylinder can be mounted coaxially around the drive shaft. The terms axial, radial or circumferential as used herein are to be understood particularly with respect to a rotational axis of the drive shaft or the hoist drum.

In embodiments, the plurality of strain gauges and the at least one drum data node are mounted on the hoist drum. The plurality of strain gauges are coupled to the at least one drum data node, particularly communicatively coupled to the at least one drum data node. For example, each of the plurality of strain gauges may be coupled by a wired connection to the at least one drum data node, the wired connection particularly providing communicative coupling. The wired connection can provide a connection for supplying power, particularly from the at least one drum data node to the plurality of strain gauges. In further embodiments, the plurality of strain gauges may be communicatively coupled to the at least one drum data node by a wireless connection.

In some embodiments, the at least one drum data node may be a single drum data node. Each of the plurality of strain gauges may be coupled to the single drum data node. In further embodiments, the at least one drum data node may include more than one drum data node, each of the more than one drum data node being coupled to at least one of the plurality of strain gauges. In even further embodiments, the at least one drum data node may include a plurality of drum data nodes, each of the plurality of drum data nodes being coupled to one of the plurality of the strain gauges.

In some embodiments, at least one strain gauge of the plurality of strain gauges is mounted to the drum cylinder, a radial structural member and/or a shaft sleeve. In embodiments, at least one strain gauge may be mounted on the drive shaft.

According to embodiments, at least one strain gauge of the plurality of strain gauges is mounted at a joint of the hoist drum. In embodiments, the hoist drum includes a drum cylinder configured for supporting a rope of the mine hoist. The hoist drum includes one or more radial structural members arranged between the drum cylinder and the drive shaft, the radial structural member particularly being configured for transmitting loads between the drum cylinder and the drive shaft. The radial structural member and the drum cylinder may be joined at a cylinder joint of the hoist drum.

In some embodiments, the radial structural member can be an annular disk or a segmented annular disk arranged around the drive shaft. In further embodiments, the radial structural member can be a radial beam. According to embodiments, the radial structural member is joined at an inner drum joint to a shaft sleeve or bushing of the hoist drum, the shaft sleeve being mounted on the drive shaft. Hoist drums with a shaft sleeve may be referred to as clutched drum. In further embodiments, the radial structural member is joined at an inner drum joint to a shaft flange of the drive shaft. Hoist drums having a drive shaft with a shaft flange may be referred to as fixed drum. For example, the radial structural member may be joined at the inner drum joint to the shaft flange by a bolted flange connection. In some embodiments, the cylinder joint and/or the inner drum joint may be a welded joint or a bolted flange joint.

According to some embodiments, at least one strain gauge of the plurality of strain gauges is arranged at the inner drum joint of the hoist drum. The inner drum joint may be a welded joint or a bolted flange joint. Particularly in hoist drums, in which the radial structural member is joined to a shaft flange, the inner drum joint can be a bolted flange joint. In some embodiments, the hoist drum can include at least two inner drum joints at different axial positions of the hoist drum. At least one strain gauge may be arranged at each of the at least two inner drum joints. Measuring strain at different axial positions may allow for example for determining an axial loading asymmetry in the hoist drum.

In some embodiments, at least one strain gauge of the plurality of strain gauges is arranged at a cylinder joint joining a radial structural member of the hoist drum and the drum cylinder. In embodiments, the cylinder joint is a welded joint. In further embodiments, the cylinder joint can be a bolted joint. In some embodiments, the hoist drum can include at least two cylinder joints at different axial positions of the hoist drum. At least one strain gauge may be arranged at each of the at least two cylinder joints. According to embodiments, at least one strain gauge of the plurality of strain gauges is arranged at a cylinder joint and at least one further strain gauge of the plurality of strain gauges is arranged at an inner drum joint. Positioning strain gauges at critical locations of the hoist drum such as joints can provide valuable indications on a strain or loading experienced by the hoist drum. Further, the integrity of joints in the hoist drum can be critical for a safe operation of the mine hoist. The placement of strain gauges at joints may enable early detection of potential damage to the joints or the hoist drum.

According to some embodiments, a subset of at least three strain gauges of the plurality of strain gauges is arranged at least substantially at the same radial and axial position of the hoist drum, the at least three strain gauges of the subset being spaced circumferentially about the rotational axis of the hoist drum. In particular, the at least three strain gauges may be at least substantially equally spaced in a circumferential direction about the rotational axis. In embodiments, the subset of strain gauges includes at least three, particularly at least four or at least five, and/or maximum 20, particularly maximum 15 or maximum 10 strain gauges. For example, the subset can include six strain gauges. It should be understood that the plurality of strain gauges can include more than one subset, each subset being arranged at a different radial and axial position. In some embodiments, the at least one radial and axial position may include for example at least one of an inner drum joint position of an inner drum joint or a cylinder joint position of a cylinder joint.

In embodiments, the plurality of strain gauges are mounted on the hoist drum via an adhesive, e.g. via an epoxy adhesive. The strain gauges may include foil gauges. The strain gauges may be monodirectional, bidirectional or multidirectional strain gauges. According to embodiments, the plurality of strain gauges may include at least 3 strain gauges, particularly at least 6 or at least 12, and/or maximum 100 strain gauges, particularly maximum 70 or maximum 50. For example, the plurality of strain gauges may include 24 strain gauges with four subsets of six circumferentially spaced strain gauges, each subset being mounted at a cylinder joint or an inner drum joint. In some embodiments, a spare strain gauge may be mounted on the hoist drum adjacent each of the plurality of strain gauges, wherein the spare strain gauges are not coupled to the at least one drum data node upon installation of the spare strain gauges on the hoist drum. A spare strain gauge adjacent a strain gauge of the plurality of strain gauges may be coupled to a drum data node upon failure of the strain gauge.

According to embodiments of the present disclosure, the at least one drum data node is configured for determining strain signals indicative of strain in the hoist drum using the plurality of strain gauges. For example, the at least one drum data node may read out strain values provided by the plurality of strain gauges. The strain signals determined by the at least one drum data node may particularly include strain values indicative of a strain measured by a strain gauge in the hoist drum and particularly an identity of the strain gauge providing a strain value and/or a position of the strain gauge providing a strain value on the hoist drum. In embodiments, the at least one drum data node or the hoist controller may be configured to map an identity of a strain gauge associated with a strain signal to a position of the strain gauge on the hoist drum.

In embodiments, each of the at least one drum data node includes a transmitter configured for transmitting the strain signals to the hoist controller using wireless transmission. The hoist controller can include a receiver gateway for receiving the strain signals from the drum data node by wireless transmission. A wireless transmission may include transmission by, e.g., radio transmission, WiFi or bluetooth. In embodiments, the transmission between the at least one drum data node and the hoist controller may be at least partially wireless. In particular, the wireless transmission may be provided between the at least one drum data node on the rotatable hoist drum and a receiver gateway positioned in a rotationally fixed position in the surroundings of the hoist drum. A wireless transmission between the at least one drum data node and the hoist controller can advantageously avoid a material data connection setup between the rotating hoist drum and the non-rotating surroundings of the hoist drum. A wireless transmission setup particularly reduce a setup of a monitoring system for a mine hoist being retrofitted with a mine hoist monitoring system according to embodiments.

According to embodiments, the at least one drum data node includes an energy storage device, particularly a battery, for supplying power to the at least one drum data node.

In particular, each of the at least one drum data nodes may include an energy storage device. The at least one drum data node may provide energy from the energy storage device to at least one strain gauge of the plurality of strain gauges.

According to embodiments, the hoist controller is configured to receive the strain signals from the at least one drum data node. The hoist controller is configured for determining a strain distribution in the hoist drum based on the strain signals. The strain distribution may be determined for the whole hoist drum or for a part of the hoist drum. In particular, the strain distribution in the hoist drum can be determined for the drum cylinder, the one or more radial structural members, the drive shaft and/or the one or more shaft sleeves.

In some embodiments, determining the strain distribution by the hoist controller includes determining a partial strain distribution for each of the strain signals and determining the strain distribution in the hoist drum based on the partial strain distributions. In embodiments, the partial strain distributions are determined by the hoist controller based on a model of the hoist drum, particularly a three-dimensional model of the hoist drum. For example, the model may include a spatial distribution of strain factors for each of the plurality of strain gauges. A spatial distribution of strain factors corresponding to a particular strain gauge may be indicative of strain in the hoist drum associated with a strain measured at the particular location of the particular strain gauge. For each strain gauge of the plurality of strain gauges, the partial strain distribution corresponding to a strain gauge may be determined based on the corresponding spatial distribution of strain factors and based on the corresponding strain signal associated with the strain gauge. In particular, the partial strain distribution corresponding to a strain gauge may be determined by scaling the corresponding spatial distribution of strain factors with the corresponding strain signal or a strain value of the strain signal. For example, the spatial distribution of strain factors may be scaled linearly with the strain signal or strain value. In embodiments, the strain distribution in the hoist drum may be determined by the hoist controller as a superposition of the partial strain distributions corresponding to the plurality of strain gauges.

In embodiments, the model of the hoist drum, particularly the spatial distributions of strain factors, may be pre-determined. The model may be based on a finite element analysis of strain in the hoist drum under load. Determining a strain distribution based on partial strain distributions according to embodiments may allow for a fast calculation and visualization of a strain distribution in the hoist drum. In further embodiments, the hoist controller may be configured to determine a strain distribution in the hoist drum using a finite element analysis based on a drum model of the hoist drum and based on the strain signals, particularly for each visualization. In some embodiments, the hoist controller may use further signals for determining the strain distribution, for example an encoder signal, the encoder signal being indicative of a rotational position of the hoist drum.

According to embodiments, the hoist controller is configured for visualizing the strain distribution. The hoist controller may visualize the strain distribution on a display of a human machine interface (HMI), e.g., on a display of an operator station of the mine hoist. The strain distribution may be visualized as a structural model of the hoist drum. The visualized structural model may include for example visualized deformations of the hoist drum based on the strain distribution and/or a visual coding, e.g., color-coding, of strain intensities of the strain distribution.

In embodiments, the visualized structural model may be dynamically updated by the hoist controller using real time strain signals obtained from the plurality of strain gauges and received from the at least one drum data node. Using real time data for visualizations of mechanical strain occurring within the hoist drum can be used to provide feedback based on the loading conditions of the hoist drum. The strain distribution or the structural model of the hoist drum can be further processed by the hoist controller through statistical analysis and/or rule-based decision making. Based on the further processing, the hoist controller may inform an operator of the mine hoist of impending damage, failures or emergency stop events, which may for example require the operator's attention. In particular, the hoist controller is configured to generate an alarm if an abnormal loading condition occurs.

According to embodiments, the hoist controller is configured for generating an alarm if the strain signals and/or the strain distribution are indicative of a strain in the hoist drum being equal or greater than a strain threshold. Embodiments of the present disclosure can enable monitoring and controlling such that predictable failures in the mine hoist are avoided based on the real time monitoring of strain in hoist drum.

According to some embodiments, the hoist controller is configured for tracking a consumed fatigue life and/or a remaining fatigue life over time based on the strain signals and/or based on the strain distribution. In particular, the consumed fatigue life of the hoist drum may be updated by the hoist controller, the consumed fatigue life growing at a life consumption rate particularly depending on a current loading condition as determined from the strain signals or the strain distribution. For example, the hoist controller may increase the consumed fatigue life at a higher life consumption rate in the case of abnormal loading conditions of the hoist drum, particularly in the case of higher than normal loading conditions. A remaining fatigue life of the hoist drum may be calculated for example by subtraction of the consumed fatigue life from a design fatigue life of the hoist drum. The consumed fatigue life and/or the remaining fatigue life can be visualized by the hoist controller, e.g., on an operator station. Embodiments can allow an operator to be constantly informed of how the operation of the mine hoist affects the consumed or remaining fatigue lift of the hoist drum.

In some embodiments, the design fatigue life can be calculated initially as a baseline fatigue life based on a theoretical model of the hoist drum. According to embodiments, design fatigue life can be validated or updated based on the consumed fatigue life and/or a strain data history, the strain data history including a log of strain signals and/or strain distribution of the hoist drum. In particular, the design fatigue life can be validated or updated based on data such as a consumed fatigue life and/or a strain data history from more than one mine hoist.

According to embodiments, the hoist controller is configured for logging the strain signals and/or the strain distribution in a strain data history. The strain data history can be used for further analysis, particularly for investigation of abnormal events in mine hoist operation or for preventative maintenance planning.

According to embodiments, the hoist controller is configured for monitoring and/or controlling the mine hoist. In particular, the hoist controller may be understood as a hoist control system. For example, the hoist controller may include or be part of a distributed control system (DCS) for controlling and/or monitoring the mine hoist. The hoist controller can include a processor. The hoist controller can include a data system, the data system including, e.g., one or more databases and/or tables, e.g. a strain data history. The data system may be provided on a memory device of the hoist controller.

In embodiments, a processor of the hoist controller may include a central processing unit (CPU). To facilitate performing operations according to embodiments described herein, the processor may be one of any form of general purpose computer processor that can be used in an industrial setting. The memory device containing the data system and/or a computer-readable medium may be coupled to the processor. The memory device and/or the computer readable medium may be one or more readily available memory devices such as random access memory, read only memory, floppy disk, hard disk, or any other form of digital storage either local or remote. The processor may be coupled to support circuits for supporting the processor in a conventional manner. These circuits may include a receiver gateway, cache, power supplies, clock circuits, input/output circuitry and related subsystems, and the like. For example, the processor may be configured to receive strain signals from a drum data node via a receiver gateway and/or user input data via input circuitry. The hoist controller or hoist control system can include a human machine interface (HMI), e.g., an operator station. The human machine interface may be local at the mine hoist site or at a remote location. The human machine interface can include a display, for example for visualizing a strain distribution in the hoist drum and/or for displaying data such as a consumed or remaining fatigue life, alarms or further notifications.

Instructions for operations of monitoring and/or controlling the mine hoist by the hoist controller according to embodiments described herein may be stored in the computer-readable medium as a software routine typically known as a recipe. The software routine, when executed by the processor, transforms the general purpose computer into a specific purpose computer, and can cause the hoist controller to carry out a method or any operations of monitoring and/or controlling the mine hoist according to embodiments of the present disclosure. Although the method of the present disclosure may be implemented as a software routine, some of the method operations that are disclosed herein may be performed in hardware as well as by the software. As such, the embodiments may be implemented in software as executed upon a computer system, and hardware as an application specific integrated circuit or other type of hardware implementation, or a combination of software and hardware.

According to embodiments, the mine hoist monitoring system may further include a network interface for connecting the mine hoist monitoring system to a network, wherein the network interface is configured to transceive data between the device and the data network, wherein the data include operational command and/or information about the mine hoist or the network. In particular, the network interface may be configured for connecting the mine hoist monitoring system to a global data network. The data network may be a TCP/IP network such as Internet. The hoist controller can be operatively connected to the network interface for carrying out commands received from the data network. The commands may include a control command for controlling the mine hoist. The commands may include a status request. In response to the status request, or without prior status request, the hoist controller may be adapted for sending status information to the network interface, and the network interface is then adapted for sending the status information over the network. In particular, the status information may include at least one of strain signals, a strain distribution, a visualization of a strain distribution, a consumed fatigue life and/or a remaining fatigue life, or an alarm. The commands may include an update command. In response to an update command, the hoist controller may update status information and/or update data in a database such as a strain data history. The database may be provided in a local data system or in a remote data system such as distributed storage units. In particular, a remote data system may accessible via the network. In some embodiments, an update command can include update data. In this case, the hoist controller is adapted for initiating an update in response to the update command and using the update data. For example, the hoist controller may be configured to use the update data to update software in the hoist controller itself and/or in the at least one drum data node. The data network may be an Ethernet network using TCP/IP such as LAN, WAN or Internet. The data network may include distributed storage units such as Cloud. Depending on the application, the Cloud can be in form of public, private, hybrid or community Cloud.

According to embodiments of the present disclosure, a method of monitoring a mine hoist including a hoist drum includes determining, by at least one drum data node mounted on the hoist drum, strain signals indicative of strain in the hoist drum, wherein the at least one drum data node determines the strain signals using a plurality of strain gauges coupled to the at least one drum data node, the plurality of strain gauges being mounted on the hoist drum. The plurality of strain gauges and the at least one drum data node may be provided according to embodiments described herein. In embodiments, the method includes transmitting, by the at least one drum data node, the strain signals to a hoist controller, the hoist controller being configured for controlling the mine hoist. In particular, transmitting the strain signals to the hoist controller can include a wireless transmission of the strain signals.

In embodiments, methods include determining, by the hoist controller, a strain distribution in the hoist drum based on the strain signals. In particular, determining the strain distribution can include determining a partial strain distribution for each of the strain signals and determining the strain distribution based on the partial strain distributions. The partial strain distributions may be determined based on a model of the hoist drum, particularly as described in embodiments of the present disclosure. In embodiments, the method includes visualizing the strain distribution, particularly by the hoist controller. The strain distribution can be visualized on a display of a human machine interface, e.g., a local or remote operator station.

In some embodiments, the method includes generating an alarm based on the strain signals and/or the strain distribution. In particular, the alarm is generated by the hoist controller. In embodiments, an alarm may be generated if the strain signals or the strain distribution are indicative of a strain in the hoist drum being equal or greater than a strain threshold. In some embodiments, the hoist controller may trigger an emergency stop of the mine hoist, if the strain signals or the strain distribution are indicative of a strain in the hoist drum being equal or greater than a further strain threshold.

According to some embodiments, the method includes tracking, by the hoist controller, a consumed fatigue life and/or a remaining fatigue life over time based on the strain signals and/or the strain distribution. The hoist controller may particularly track the consumed fatigue life and/or the remaining fatigue life according to embodiments described herein. The hoist controller may visualize the consumed fatigue life and/or the remaining fatigue life, for example as a number or as a graphical representation on a display of a human machine interface, e.g., of an operator station.

According to some embodiments, the mine hoist and the method are to be used in underground mining.

Embodiments of the present disclosure may provide feedback to an owner or operator of a mine hoist with respect to mechanical strain occurring within the hoist drum of the mine hoist. Monitoring the mine hoist according to embodiments can provide a thorough understanding of the specific mine hoist equipment, of the effect of different loading conditions on the fatigue life of the mine hoist and/or of the loading profile the mine hoist has experienced through its life so far. Monitoring according to embodiments can provide the advantage that failures of the mine hoist due to mechanical strain in the hoist drum may be avoided. Maintenance of the mine hoist may be planned in advance, particularly based on the strain signals or strain distributions provided by monitoring the mine hoist. Costs of a downtime of the mine hoist may be reduced. Monitoring the mine hoist can allow the mine hoist owner or operator to more accurately estimate and/or more efficiently use the mine hoist in view of the remaining fatigue life of the mine hoist.

Further aspects, benefits, and features of the present disclosure are apparent from the claims, the description, and the accompanying drawings.

BRIEF DESCRIPTION OF THE DRAWINGS

The accompanying drawings relate to embodiments of the disclosure and are described in the following.

DETAILED DESCRIPTION

Reference will now be made in detail to the various embodiments of the disclosure, one or more examples of which are illustrated in the figures. Within the following description of the drawings, the same reference numbers refer to same components. Generally, only the differences with respect to individual embodiments are described. Each example is provided by way of explanation of the disclosure and is not meant as a limitation of the disclosure. Further, features illustrated or described as part of one embodiment can be used on or in conjunction with other embodiments to yield yet a further embodiment. It is intended that the description includes such modifications and variations.

Figure 1:
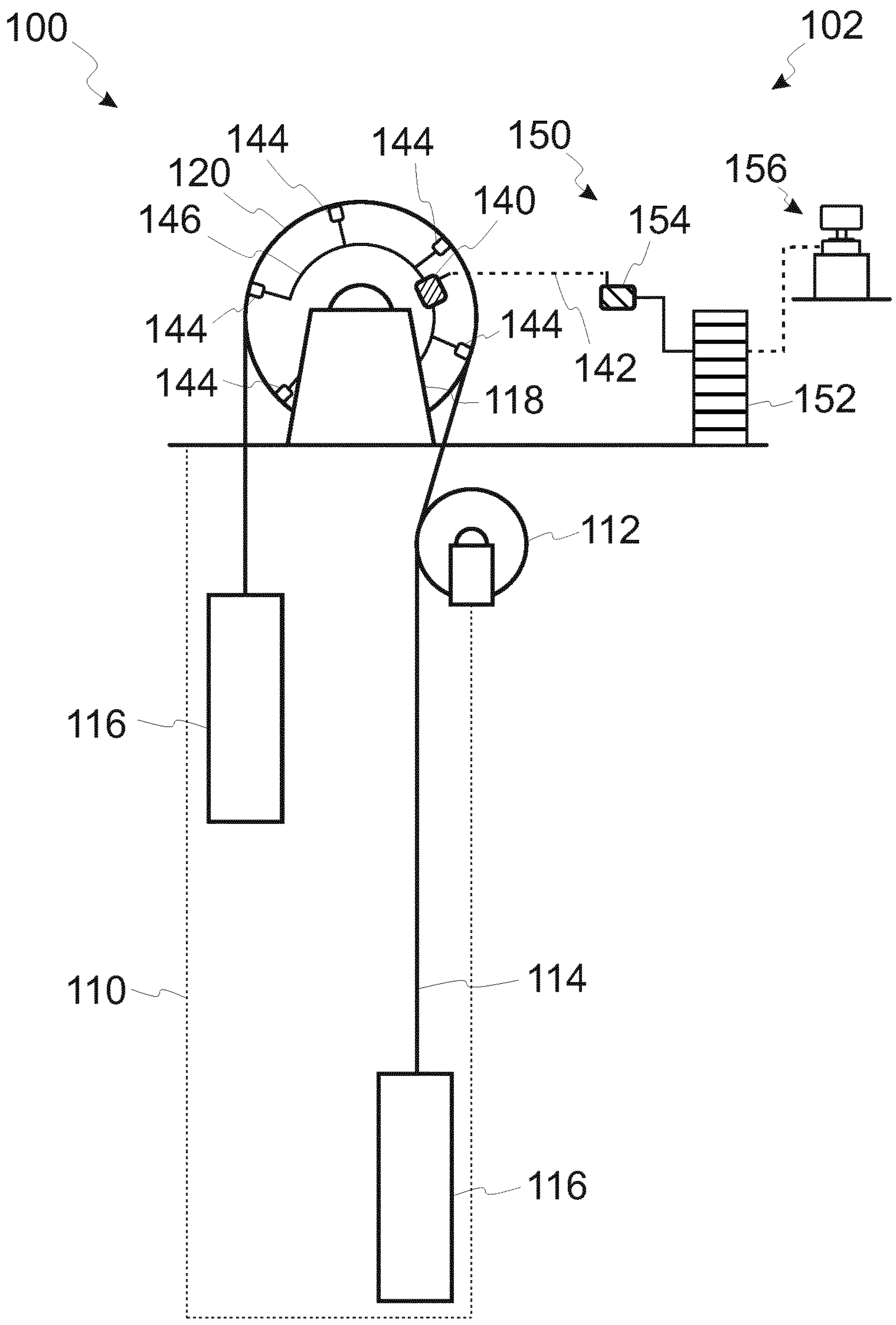
FIG. 1 schematically illustrates a mine hoist and a mine hoist monitoring system according to embodiments described herein.

FIG. 1 schematically illustrates a mine hoist 100 for underground mining including a mine hoist monitoring system 102 according to embodiments described herein. The mine hoist 100 includes a hoist drum 120, the hoist drum 120 having a drive shaft supported by bearings 118 of the mine hoist 100. The hoist drum 120 can be rotated by a mine hoist drive (not shown). The hoist drum 120 includes a rope support surface for supporting one or more ropes 114. Each end of the rope 114 is connected to a conveyance 116 of the mine hoist 100, the conveyances being configured for receiving mined material, mining equipment and/or mining personnel. In FIG. 1, the rope 114 is redirected by a diverter pulley 112. The mine hoist 100 is configured to move the conveyances 116 in a mine shaft 110 by rotating the hoist drum 120.

The mine hoist monitoring system 102 includes a plurality of strain gauges 144 and a drum data node 140. The plurality of strain gauges 144 and the drum data node 140 are mounted on the hoist drum 120. Each of the plurality of strain gauges 144 is coupled to the drum data node 140 via a sensor connection 146. In FIG. 1, each strain gauge 144 of the plurality of strain gauges 144 is particularly coupled to a single drum data node 140 by a sensor connection 146 being provided as a wired connection. The drum data node 140 is configured for determining strain signals indicative of strain in the hoist drum 120 using the plurality of strain gauges 144. The drum data node 140 includes a transmitter for transmitting the strain signals by wireless transmission 142.

The mine hoist monitoring system 102 includes a hoist controller 150 or hoist control system. The hoist controller 150 is positioned off the hoist drum 120, particularly not on the hoist drum 120. In FIG. 1, the hoist controller 150 inter alia includes a receiver gateway 154, a control cabinet 152 and a local or remote operator station 156. The receiver gateway 154 is positioned within a transmission range of the drum data node 140. The receiver gateway 154 is configured for receiving the strain signals from the drum data node 140 by wireless transmission 142. The receiver gateway 154 is communicatively coupled to the control cabinet 152 and transmits the strain signals to the control cabinet 152, which is configured for determining a strain distribution in the hoist drum 120 based on the strain signals. It should be understood that in further embodiments the strain distribution may be determined for example by any local or remote computer or server of the hoist controller 150 or hoist control system. The hoist controller 150 is configured for visualizing the strain distribution on a local or remote operator station 156, particularly on a display of the operator station 156.

Figure 2A:
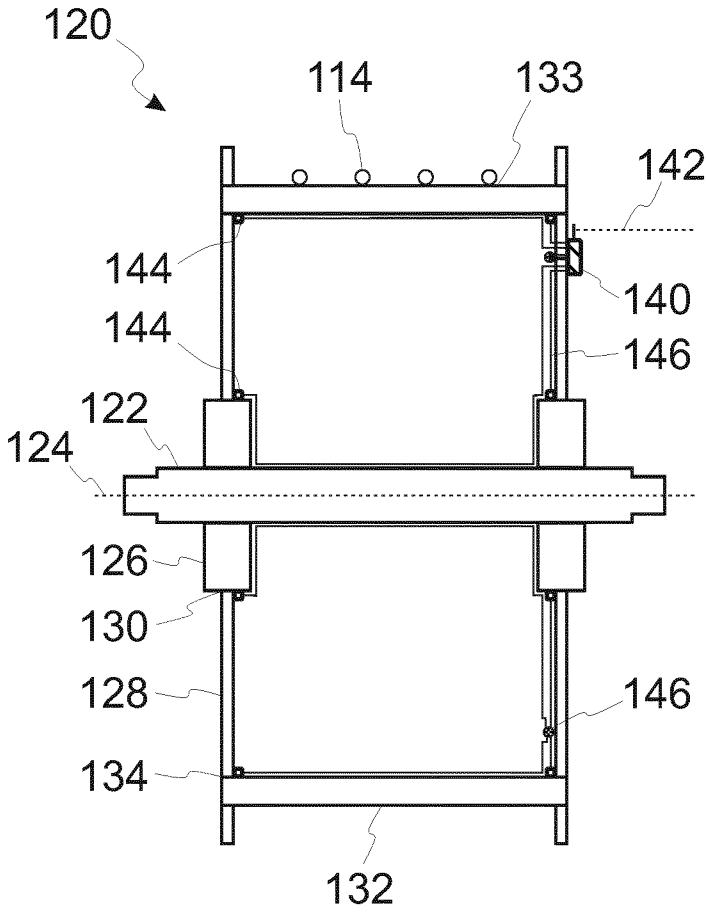
FIGS. 2A-2B each schematically illustrate a hoist drum according to embodiments.

FIG. 2A schematically illustrates an axial section of a hoist drum 120 with a plurality of strain gauges 144 and a drum data node 140 mounted on the hoist drum 120. The hoist drum 120 includes a drum cylinder 132 having a rope support surface 133 for supporting the ropes 114 of the mine hoist. The drum cylinder 132 is arranged coaxially with a drive shaft 122 of the hoist drum 120 around a rotational axis 124 of the hoist drum 120. The configuration of the hoist drum 120 illustrated in FIG. 2A is often referred to as clutched drum. The hoist drum 120 includes shaft sleeves 126 mounted on the drive shaft 122. Radial structural members 128, in FIG. 2A an annular disk, extends radially between each of the shaft sleeves 126 and the drum cylinder 132. The radial structural members 128 are configured for transmitting loads between the drum cylinder 132 and the drive shaft 122. The radial structural members 128 are each joined to one of the shaft sleeves 126 by an inner drum joint 130. The radial structural members 128 are each joined to the drum cylinder 132 by a cylinder joint 134. In the example of FIG. 2A, the inner drum joints 130 and the cylinder joints 134 are formed as a welded joint.

In FIG. 2A, strain gauges 144 of the plurality of strain gauges 144 are mounted at each of the inner drum joints 130 and the cylinder joints 134. In particular, six circumferentially spaced strain gauges 144 are mounted at each of the inner drum joints 130 and the cylinder joints 134. The drum data node 140 is mounted to one of the radial structural members 128. It should be understood that in further embodiments, the drum data node may be mounted to another part of a hoist drum, e.g., the drum cylinder, a shaft sleeve or a location suitable for wireless data transmission towards an receiver gateway of the hoist controller. Each of the plurality of strain gauges 144 is connected to the drum data node 140 by a sensor connection 146. The drum data node 140 includes a battery for supplying power to the drum data node 140 and to the plurality of strain gauges 144. The battery is configured to supply the drum data node 140 and the plurality of strain gauges 144 with energy over months or more than year.

Figure 2B:
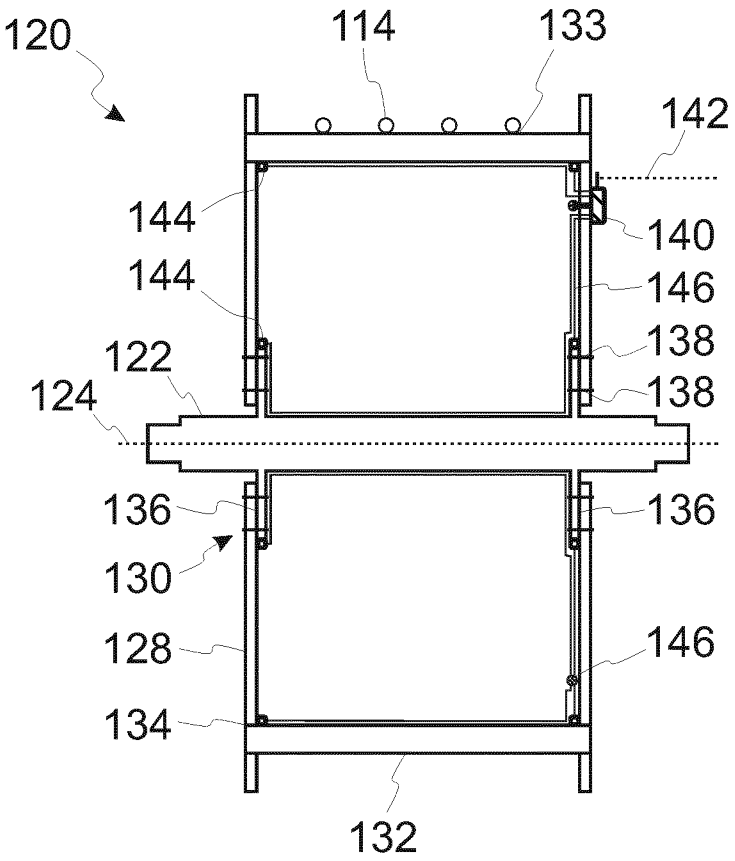

FIG. 2B shows a hoist drum 120 of a different configuration than in FIG. 2A, in particular a configuration often referred to as fixed drum. The drive shaft 122 includes shaft flanges 136 protruding in a radially outward direction from the drive shaft 122. Each of the radial structural members 128 is joined to one of the shaft flanges 136 by a flange joint. In particular, the radial structural members 128 each include a flange portion at the inner radial end of the radial structural member 128. The flange portion of each of the radial structural members 128 is joined by bolts 138 to a shaft flange 136, forming an inner drum joint 130 of the hoist drum 120. The plurality of strain gauges 144 and the drum data node 140 are mounted similarly as in FIG. 2A.

Figure 3:
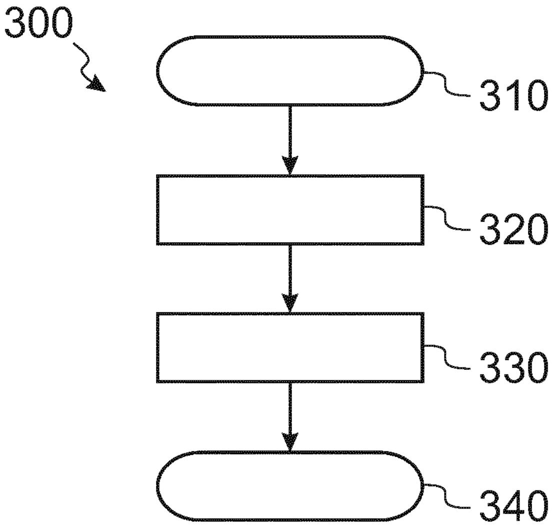
FIG. 3 schematically illustrates a flow diagram of a method according to embodiments.

FIG. 3 schematically illustrates a flow diagram of a method 300 of monitoring a mine hoist 100, particularly a mine hoist 100 as described herein. At block 310, the drum data node 140 determines strain signals indicative of strain in the hoist drum 120 using the plurality of strain gauges 144. At block 320, the drum data node 140 transmits the strain signals to the hoist controller 150 by wireless transmission. The hoist controller 150 receives the strain signals via a receiver gateway 154 of the hoist controller 150.

At block 330, the hoist controller 150 determines a partial strain distribution for each of the strain signals, wherein each of the partial strain distributions is determined based on a strain signal associated with a strain gauge and based on a spatial distribution of strain factors corresponding to the strain gauge. For each strain gauge 144, a corresponding spatial distribution of strain factors is based on a previously run finite element analysis of a loading condition of the hoist drum 120. The hoist controller 150 further determines a strain distribution in the hoist drum 120 based on the partial strain distributions, particularly by superposing the partial strain distributions. At block 330, the hoist controller 150 further tracks a consumed fatigue life based on the strain signals. In particular, the hoist controller 150 increases the consumed fatigue life depending on the loading condition experienced by the hoist drum 120, the loading condition being indicated by the strain signals. At block 330, the hoist controller 150 further generates an alarm if the strain signals or the strain distribution are indicative of a strain in the hoist drum being equal or greater than a strain threshold.

At block 340, the hoist controller 150 visualizes the strain distribution, the consumed fatigue life and/or the remaining fatigue life on a display of an operator station 156. Further, if an alarm was generated at block 330, the hoist controller 150 visualizes the alarm on the display of the operator station. Additionally or alternatively, the hoist controller 150 may generate an alarm sound.

Figure 4A:
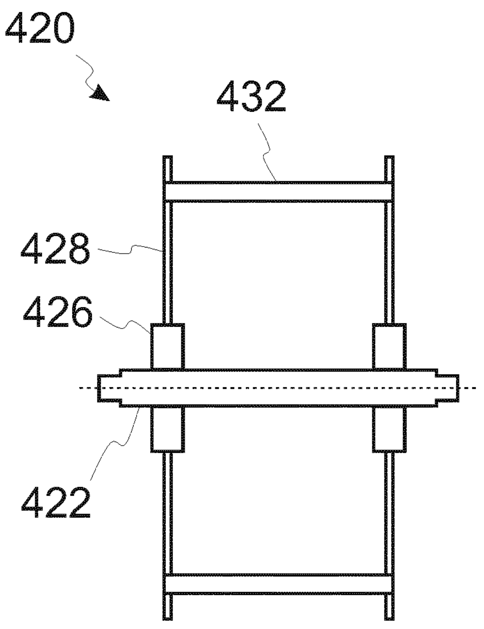
FIGS. 4A-4B schematically illustrate a visualization of a hoist drum according to embodiments of the present disclosure.
Figure 4B:
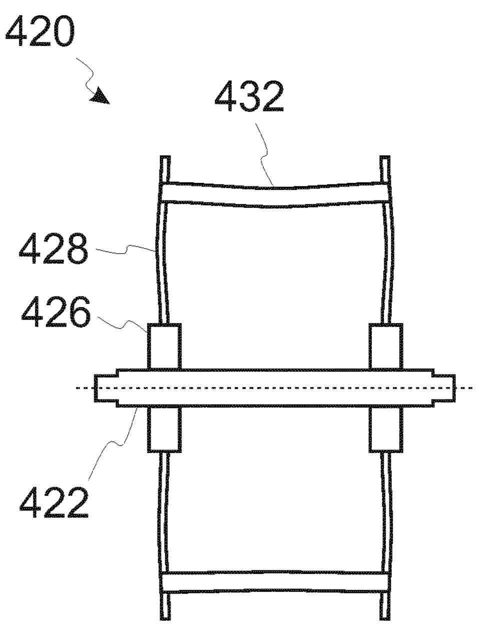

FIGS. 4A and 4B schematically illustrate visualizations of strain distributions by the hoist controller 150. In FIGS. 4A and 4B, the visualizations include a visualized hoist drum 420 having a visualized drive shaft 422, visualized shaft sleeves 426, visualized radial structural members 428 and a visualized drum cylinder 432. The visualizations correspond to a type of hoist drum as illustrated for example in FIG. 2A. It should be understood that a similar visualization may be provided for a hoist drum as illustrated in FIG. 2B or other configurations of hoist drums. FIG. 4A illustrates a strain distribution of a hoist drum 120 under little or no load. FIG. 4B shows a visualized hoist drum 420 corresponding to a hoist drum 120 under high load. In FIG. 4B, the strain intensities of the strain distribution are visualized as local deformations of the visualized hoist drum 420. In further embodiments, the strain intensities of the strain distribution may be additionally or alternatively visualized, e.g., by color-coding. Embodiments of the present disclosure can enable the generation of a digital twin model of the hoist drum based on an analysis, visualization, logging and/or tracking of strain conditions in the hoist drum. Such a digital twin model may enable monitoring and controlling of the mine hoist to increase the safety or efficiency of mine hoist operation, avoid mine hoist failures or reduce downtime costs or maintenance costs of the mine hoist.

While the foregoing is directed to embodiments of the disclosure, other and further embodiments of the disclosure may be devised without departing from the basic scope thereof, and the scope thereof is determined by the claims that follow.

The invention claimed is:

1. A mine hoist monitoring system for monitoring a mine hoist including a hoist drum, the mine hoist monitoring system comprising:

a hoist controller controlling the mine hoist;

a plurality of strain gauges configured to be mounted on the hoist drum; and at least one drum data node configured to be mounted on the hoist drum, the plurality of strain gauges being coupled to the at least one drum data node, wherein the at least one drum data node determines strain signals indicative of strain in the hoist drum using the plurality of strain gauges;

wherein the at least one drum data node transmits the strain signals to the hoist controller;

wherein the hoist controller determines a strain distribution in the hoist drum based on the strain signals received from the at least one drum data node, wherein the hoist controller visualizes the strain distribution; and wherein the hoist controller determines a current loading condition of the hoist drum from the strain distribution in the hoist drum, and wherein the hoist controller further tracks a consumed fatigue life over time base on the current loading condition.

2. The mine hoist monitoring system according to claim 1, wherein each of the at least one drum data node comprises a transmitter configured for transmitting the strain signals to the hoist controller using wireless transmission.

3. The mine hoist monitoring system according to claim 2, wherein at least one strain gauge of the plurality of strain gauges is arranged at an inner drum joint, wherein the inner drum joint joins a radial structural member of the hoist drum and a shaft flange of a drive shaft of the hoist drum, or wherein the inner drum joint joins a radial structural member and a shaft sleeve of the hoist drum, the shaft sleeve being mounted to a drive shaft of the hoist drum.

4. The mine hoist monitoring system according to claim 2, wherein at least one strain gauge of the plurality of strain gauges is arranged at a cylinder joint joining a radial structural member of the hoist drum and a drum cylinder of the hoist drum, the radial structural member being positioned radially between a drive shaft of the hoist drum and the drum cylinder.

5. The mine hoist monitoring system according to claim 2, wherein the at least one drum data node comprises an energy storage device for supplying power to the at least one drum data node.

6. The mine hoist monitoring system according to claim 2, wherein the hoist controller is configured for generating an alarm if the strain signals and/or the strain distribution are indicative of a strain in the hoist drum being equal or greater than a strain threshold.

7. The mine hoist monitoring system according to claim 1, wherein at least one strain gauge of the plurality of strain gauges is arranged at an inner drum joint, wherein the inner drum joint joins a radial structural member of the hoist drum and a shaft flange of a drive shaft of the hoist drum, or wherein the inner drum joint joins a radial structural member and a shaft sleeve of the hoist drum, the shaft sleeve being mounted to a drive shaft of the hoist drum.

8. The mine hoist monitoring system according to claim 1, wherein at least one strain gauge of the plurality of strain gauges is arranged at a cylinder joint joining a radial structural member of the hoist drum and a drum cylinder of the hoist drum, the radial structural member being positioned radially between a drive shaft of the hoist drum and the drum cylinder.

9. The mine hoist monitoring system according to claim 1, wherein the at least one drum data node comprises an energy storage device for supplying power to the at least one drum data node.

10. The mine hoist monitoring system according to claim 1, wherein the hoist controller is configured for generating an alarm if the strain signals and/or the strain distribution are indicative of a strain in the hoist drum being equal or greater than a strain threshold.

11. The mine hoist monitoring system according to claim 1, wherein the hoist controller is configured for controlling the mine hoist based on the current loading condition.

12. The mine hoist monitoring system according to claim 1, wherein determining the strain distribution by the hoist controller includes determining a partial strain distribution for each of the strain signals and determining the strain distribution based on the partial strain distributions.

13. The mine hoist monitoring system according to claim 12, wherein the partial strain distributions are determined based on a model of the hoist drum.

14. A method of monitoring a mine hoist including a hoist drum, the method comprising:

determining, by at least one drum data node mounted on the hoist drum, strain signals indicative of strain in the hoist drum, wherein the at least one drum data node determines the strain signals using a plurality of strain gauges coupled to the at least one drum data node, the plurality of strain gauges being mounted on the hoist drum;

transmitting, by the at least one drum data node, the strain signals to a hoist controller, the hoist controller being configured for controlling the mine hoist;

determining, by the hoist controller, a strain distribution in the hoist drum based on the strain signals; and visualizing the strain distribution;

determining a current loading condition of the hoist drum om the strain distribution in the hoist drum; and tracking, by the hoist controller, a consumed fatigue life over time based on the current loading condition.

15. The method according to claim 14, wherein transmitting the strain signals to the hoist controller includes a wireless transmission of the strain signals.

16. The method according to claim 5, further comprising:

generating, by the hoist controller, an alarm if the strain signals or the strain distribution are indicative of a strain in the hoist drum being equal or greater than a strain threshold.

17. The method according to claim 14, wherein determining the strain distribution comprises determining a partial strain distribution for each of the strain signals and determining the strain distribution based on the partial strain distributions.

18. The method according to claim 17, wherein the partial strain distributions are determined based on a model of the hoist drum.

19. A mine hoist comprising a mine hoist monitoring system including a hoist controller configured for controlling the mine hoist;

a plurality of strain gauges configured to be mounted on the hoist drum; and at least one drum data node configured to be mounted on the hoist drum, the plurality of strain gauges being coupled to the at least one drum data node, wherein the at least one drum data node determines strain signals indicative of strain in the hoist drum using the plurality of strain gauges;

wherein the at least one drum data node transmits the strain signals to the hoist controller;

wherein the hoist controller determines a strain distribution in the hoist drum based on the strain signals received from the at least one drum data node, wherein the hoist controller visualizes the strain distribution; and wherein the hoist controller determines a current loading condition of the hoist drum from the strain distribution in the hoist drum, and wherein the hoist controller further tracks a consumed fatigue life over time based on the current loading condition.

* * * * *